United States Patent [19]
Saeki et al.

[11] Patent Number: 4,678,508
[45] Date of Patent: Jul. 7, 1987

[54] METHOD FOR FLUIDIZED BED REDUCTION OF IRON ORE

[75] Inventors: Osamu Saeki; Kenji Mori, both of Kobe; Mamoru Onoda, Hyogo; Ryo Watanabe, Kobe; Katsufumi Shinohara, Kobe; Takehiko Ashie, Kobe; Nobuyuki Imanishi, Kobe, all of Japan

[73] Assignee: Kabushiki Kaisha Kobe Seiko Sho, Kobe, Japan

[21] Appl. No.: 775,394

[22] Filed: Sep. 12, 1985

[30] Foreign Application Priority Data

Sep. 12, 1984 [JP]  Japan ................... 59-191330

[51] Int. Cl.$^4$ ............................................. C21B 13/02
[52] U.S. Cl. ................................. 75/26; 75/38; 266/160; 266/172
[58] Field of Search ............... 75/26, 38; 266/172, 266/160

[56] References Cited

U.S. PATENT DOCUMENTS

| | | | |
|---|---|---|---|
| 4,045,214 | 8/1977 | Wetzel et al. | 75/38 |
| 4,095,960 | 6/1978 | Schuhmann, Jr. | 48/197 R |
| 4,420,332 | 12/1983 | Mori et al. | 75/26 |
| 4,448,402 | 5/1984 | Weber et al. | 75/38 |

*Primary Examiner*—Melvyn J. Andrews
*Attorney, Agent, or Firm*—Oblon, Fisher, Spivak, McClelland & Maier

[57] ABSTRACT

A method of using coal for reducing iron ore in a fluidized bed to obtain a reduced iron comprising fluidizing and pylolysis of a fine coal in a first fluidized bed, fluidized and thermal cracking the vapored material from the first fluidized bed in a second fluidized bed to deposit carbon on the surface of iron ore particles, fluidizing and reducing the iron ore in a third fluidized bed using reducing gas from generator.

12 Claims, 5 Drawing Figures

METHOD FOR FLUIDIZED BED REDUCTION OF IRON ORE

BACKGROUND OF THE INVENTION (1) Field of the Invention

The present invention relates to a method for using coal to reduce iron ore efficiently in a fluidized bed to obtain a reduced iron.

(2) Description of the Prior Art

Iron and steel production mainly depends on the method such as a blast furnace-converter. However, a direct reduction which obtains a reduced iron by a shaft furnace or a rotary kiln has been put to practical use. (1) in the blast furnace-converter process, iron ore powder is pre-processed into an agglomerate (pellet, sinter, briquet, etc.) or lump iron ore is necessary to be used. The same is true for the direct reduction. However, if the iron ore powder can be reduced while using it as a raw material, process for forming into an agglomerate is cut down. (2) In the iron making process using the blast furnace, a large quantity of coke is used and therefore a coke oven has to be provided. Therefore, large-scaled equipment and a material storing yard and the like are required. Selection of raw coal is also important to produce a high quality coke which is used for blast furnace. (3) On the other hand, a direct reduction using fluidized bed has been studied and put into practical use. In the direct reduction, only a method of using reducing gas which is obtained by reforming natural gas has been commercially installed. A method of gasifying coal to obtain a reducing gas to use in the direct reduction of iron ore as a reducing agent can be established in a technical sense but has not been carried out as that is expensive.

The most significant problem of the fluidized bed reduction is the so called "sticking" problem in which iron ore particles aggromelete into larger granules and fluidization can not continue. To prevent this phenomena, operation temperature should be held lower than 800° C. at the sacrifice of reduction velocity. The following have been proposed as the other means to prevent the sticking: (1) coarse iron powder is used, (2) the interior of a fluidized bed reactor is mechanically agitated by means of an agitator or the like, (3) coke powder or the like is mixed into the fluidized bed reactor, and (4) an iron ore powder is coated with a nonferrous oxide such as MgO or CaO. These methods have been found to be considerably effective in an experimental stage. However, employment of these methods for practical use poses problems that in method (1), cost for adjustment of grain size is increased and a reaction velocity is lowered; in method (2), an impeller becomes worn due to the high temperature and a seal is complicated; in method (3) the coke powder is remarkable consumed, and the coke powder or the like is apt to be separated from the iron ore due to the difference of specific gravities; and in method (4), complete coating is difficult as the coat increases.

To prevent the sticking in the fluidized bed reduction, there is a method in which iron ore and coal are mixed in the fluidized bed reactor. However, in such method the following problems are expected to take place:

(1) An ash contained in coal should be removed before to introduce into fluidized bed, to reduce gangue content in reduced iron as product. Otherwise the magnetic separation of gangue originated from ash in coal should be required to obtain the desired product.

SUMMARY OF THE INVENTION

The present invention provides a method of reducing iron ore by the fluidized bed reduction, which comprises supplying char produced by pyrolysis in a first fluidized bed reactor as a gas generating apparatus, supplying a gas and hydrocarbon vapor which are produced by pyrolysis of coal in the first reactor to the second fluidized bed reactor where a gas and hydrocarbon vapor thereof are cracked, and by produced coke is deposited on the surface of iron ore particles. Basically, the aforementioned iron ore on which coke is deposited is subject to reduction in a third fluidized bed reactor, an effluent from the second fluidized bed reactor is mixed with the gas from the gas generating apparatus and it is supplied to the third fluidized reactor as reducing gas or iron ore.

In view of the foregoing, the present invention provides a technique which can prevent an occurrence of sticking in the high temperature fluidized bed reducing furnace, and which also can supply char to the gas generating apparatus and improve the quality of gas which utilized for the fluidized bed reduction and thereby the efficiency of the reduction is improved.

DETAILED DESCRIPTION OF THE INVENTION AND PREFERRED EMBODIMENTS

According to the present invention, a small quantity of carbon is deposited on the surface of particular iron ore which is subjected to fluidized bed reduction separately provided by a fluidized bed thermal reactor. Where the particular iron ore with the carbon deposited thereto as described is subjected to fluidized bed reduction, even if a reduction temperature is increased, no sticking phenomenon occurs, and the reducing reaction can proceed efficiently under the controlled fluidization.

Figure 1:
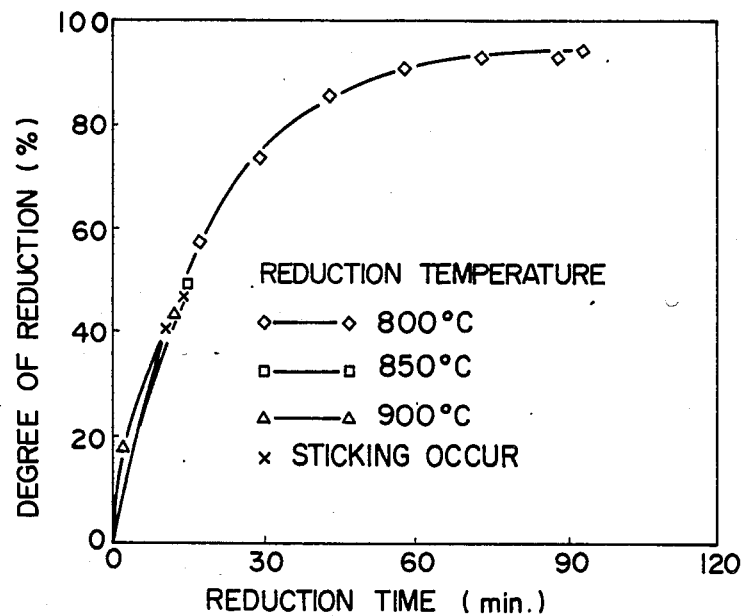
FIG. 1 is a graph showing the relationship between the reduction time and the degree of reduction.
Figure 2:
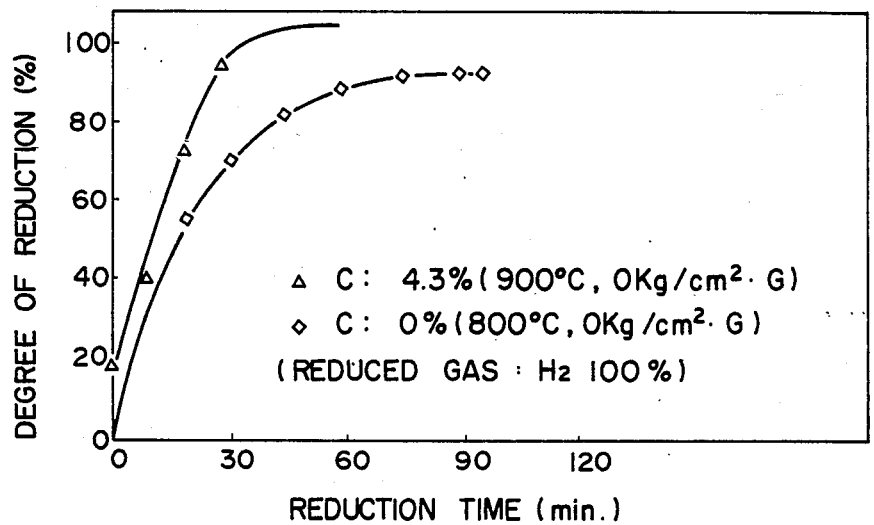
FIG. 2 showing the relationship between the reduction and the degree of reduction.

As will be apparent from FIG. 1, where iron ore not coated with carbon is subjected to fluidized bed reduction, when the reaction temperature is set to 850° C., the sticking occurs when the degree of reduction reaches approximately 40% and stops the fluidization. Reduction of iron ore can no longer proceed. The upper limit of reduction temperature at which more than 90% of degree of reduction is obtained without occurrence of sticking is approximately 800° C. And also, it takes a long time, about 60 minutes, until the degree of reduction reached 90% at such low reaction temperature as described, and can not obtain a high productivity. On the other hand, as shown in FIG. 2, if the carbon deposition processing is applied preliminary so that approximately 4% of carbon is deposited on the granular iron ore particles, even if the temperature of fluidized bed reduction is increased up to 900° C. or more, no sticking phenomena occurs and the rate of reduction can be increased and degree of reduction approximately 90% is obtained within only about 25 minutes. It is apparent from FIG. 3 that in the fluidized bed reduction, the rate of reduction can be further increased by increasing pressure of a reduction furnace, and when carbon coated iron ore is used time required to reach 90% of degree of reduction is further shortened and it was within 15 minutes. Temperature of gas which is produced by $CO_2$ and $H_2O$ in addition to CO and composition of such gas is not suitable for reduction. In present invention, to improve the quality of such gas, hydrocarbon from the preliminary processing step (the second fluidized bed) is introduced and mixed with the gas from the gas generating apparatus. Thereby the composition of gas is improved by the reaction between hydrocarbon and $CO_2$ and $H_2O$ which is contained in gas from gas generating apparatus. And at the same time gas temperature is decreased by heat of reaction described above. So the quality of gas is provided suitable for reduction. Alternatively, hydrocarbon from the preliminary processing step is subjected to steam reforming and converted into CO and $H_2$, those were converted in steam reforming are mixed with the gas from the gas generating apparatus to obtain a similar effect.

Figure 3:
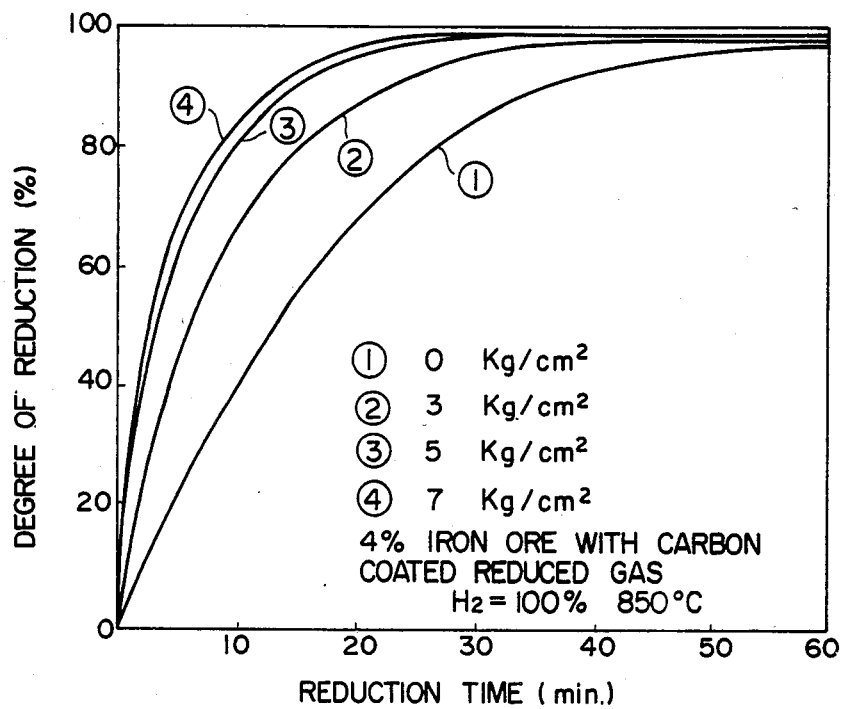
FIG. 3 is showing the reduction time and the degree of reduction.
Figure 4:
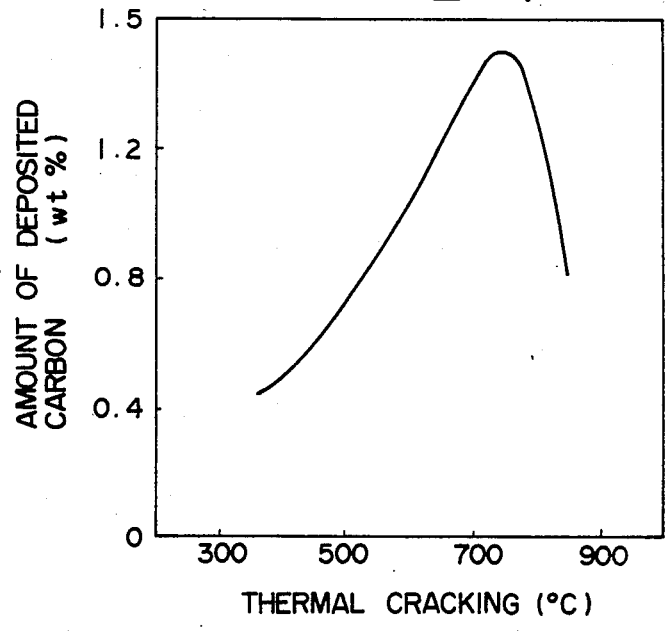
FIG. 4 is a graph showing the relationship between the thermal cracking temperature and the amount of carbon deposited on iron ore particle.

According to the present invention, the first fluidized bed reactor for pyrolysis of coal is operated at a temperature in the range of 450° to 700° C., preferably, 500° to 600° C. In the second fluidized bed for thermal cracking of hydrocarbon and depositing carbon on the surface of iron ore particle, the operating temperature is in the range of 450° to 850° C. as shown in FIG. 4 preferably, 650° to 800° C., more preferably, 700° to 775° C., which is optimum. In the third fluidized reactor for reduction of iron ore, the practical temperature is in the range of from 800° to 1100° C., and the optimal temperature is in the range of from 850° to 950° C. to improve rate of reduction to prevent sticking. In these ranges of temperature, the practical operating pressure is in the range of 0 to 7 kg/cm$^2$ as shown in FIG. 3. However, the optimal pressure is in the range of from 3 to 5 kg/cm$^2$ to improve the rate of reduction. In the present invention, the first fluidized bed reactor for pyrolysis of coal is provided forwardly of the second fluidized bed reactor so that hydrocarbon produced in the first fluidized bed reactor is charged into the second fluidized bed reactor in which iron ore powder is also charged and those mutually contact for thermal cracking of hydrocarbon under the fluidizing condition. According to the just-mentioned process, the carbonaceous material uniformly deposited on the particles of iron ore and cover it to effectively prevent the sticking during the fluidized bed reduction. The quantity of carbonaceous material deposited on the surface of iron ore is not particularly limited but it is assured from experiments that 2 to 10 weight percent, preferably 3.5 to 5 weight percent to more positively prevent sticking.

The method which introduces coal into the fluidized bed reduction of iron ore have been known, for example, from Japanese Patent Application Laid-open No. 48622/79, filed by Kawaskai Seitetsu, in which coal and iron ore are introduced into fluidized bed reducing furnace to prevent direct contact of iron ore particles and sticking of the particles. However, this method comprises carbonaceous material such as coal or coke is directly mixed with iron ore in the fluidized bed reducing furnace. On the other hand, according to the present invention, coal is treated by pyrolysis in a separate fluidized bed reactor prior to the fluidized bed reduction to produce gas and tar, which is mainly composed of hydrocarbon, and char. The tar is subjected to thermal cracking and carbonaceous material is deposited on the surface of iron ore. The gas produced by thermal cracking which is rich in hydrocarbon, is mixed with the gas from the gas generating apparatus and improved in quality of the gas from the gas generating apparatus. Or the gas produced by thermal cracking is converted by steam reforming and the resultant gas rich in $H_2$ and CO is mixed with the gas which is produced in the gas generating apparatus to provide a temperature and composition suitable for reduction, and the carbon coated iron ore is reduced in a reducing furnace using the aforesaid gas as a reducing agent. The art of the present invention is basically different form the Kawasaki Seitetsu' method in that char produced during the pyrolysis of coal is supplied as a carbon source to the gas generating apparatus.

EMBODIMENT 1

Figure 5:
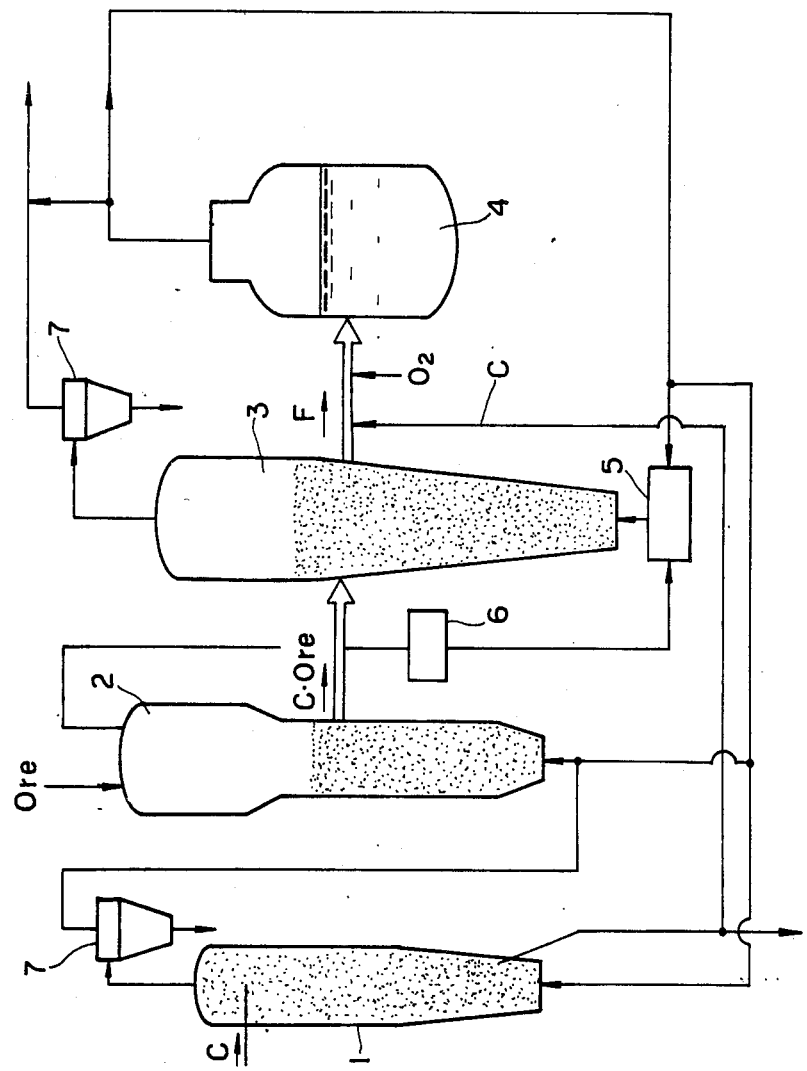
FIG. 5 is a schematic flow sheet showing an example of the present invention.

FIG. 5 illustrates an example of a flow for the fluidized bed reduction in accordance with the present invention. Reference numeral 1 designates a fluidized bed pyrolysis furnace, 2 a fluidized bed tar and gas thermal cracking furnace, 3 a fluidized bed reducing furnace, 4 a smelting reducing vessel as a reducing gas generating apparatus, 5 a mixing vessel for upgrading gas, 6 a steam reforming unit, and 7 a cyclone.

In the following, the flow of the process will be described. 0.86 t/d of pulverized coal was supplied to the fluidized bed treated furnace for pyrolysis and treated at 580° C. The produced gas and tar were supplied to the fluidized bed thermal cracking furnace. While 1.6 t/d of ironn ore powder is supplied to and fluidized in the fluidized bed thermal cracking furnace, the gas and tar supplied from the fluidized bed pyrolysis furnace is subjected to thermal cracking at 750° C. thereof to generate a gas rich in light hydrocarbon and a tar vapor. At the same time the coke produced by the thermal cracking of the gas and tar and it is deposited on the surface of iron ore and at the same time the iron ore is reduced to magnetite from hematite.

In the fluidized bed pyrolysis furnace 1, coal is converted to tar, gas and char.

The char was fed to the smelting reducing vessel as a reduction gas generating apparatus serves as a heat and a reducing gas source of the vessel. The vessel was operated at about 1,580° C.

The hydrocarbon generated from the thermal cracking furnace are reformed into CO and $H_2$ in the steam reformer and mixed with the reduced gas produced in the smelting reducing vessel in the mixing vessel 5. The aforesaid mixed gas is controlled in temperature and composition, after which it is supplied to the fluidized bed reducing furnace 3. The coke-coated iron ore produced in the fluidized bed thermal cracking furnace 2 is fed to the fluidized bed reducing furnace 3 and reduced by the reducing gas fed from the mixing vessel 5. The fluidized bed reducing furnace 3 was operated at 850° C., and the degree of reduction of iron ore was 70%.

1.03 t/d of molten iron and 0.18 t/d of slag were produced by the smelting reducing vessel.

EXAMPLE 2

In the flow sheet of FIG. 5, the gas containing hydrocarbon produced in the tar and gas thermal cracking furnace 2 is mixed with the gas generated in the smelting reducing vessel 4 not through the steam reformer 6 into the mixing vessel 5 in which mixed gases are improved and controlled in temperature and composition. Similar to Example 1, where the 0.86 t/d of coal is is supplied to the fluidized bed pyrolysis furnace 1, the gas and tar containing the hydrocarbon produced in the thermal cracking furnace which contains 0.186 t/d of carbon and 0.03 t/d of hydrogen and is mixed with the reduced gas at 1,500° C. produced in the smelting reducing vessel (composition comprising CO 67%, $H_2$ 17%, $CO_2$ 7.5% and $H_2O$ 7.4%), as a result of which the quality-improved gas is at a temperature of 970° C., and the composition of the gas was improved to CO 58%, $H_2$ 28%, $CO_2$ 6%, $H_2O$ 2% and $CH_4$ 6%.

Further, in the first fluidized bed furnace, the char which is obtained by pyrolysis of coal is lowered in volatile portion from 40% to 10% and increased in fixed carbon portion from 52% to 72%, and as a result, the char can be supplied as a carbon smelting reducing vessel (composition comprising CO 67%, $H_2$ 17%, $CO_2$ 7.5% and $H_2O$ 7.4%), as a result of which the reducing gas is at a temperature of 970° C., and the gas composition comprises CO 58%, $H_2$ 28%, $CO_2$ 6%, $H_2O$ 2% and $CH_4$ 6%.

Further, the char which is obtained by pyrolysis of coal in the first fluidized bed furnace is lowered in volatile content from 40% of coal to 10% and increased in fixed carbon content from 52% of coal to 72%. The char was suitable for melting reduction as a high quality carbonaceous material.

The present invention is designed as described above. In short, a suitable quantity of carbonaceous material is deposited on the surface of iron ore powder prior to fluidized bed reduction whereby even if the reducing temperature increases, it is possible to positively prevent an occurrence of sticking, and the reducing gas suitable for reduction is produced by mixing the gaseous product obtained by the thermal cracking of tar and gas produced in the gas generating apparatus in which char produced by pyrolysis of coal is used, whereby the fluidized bed reduction can be performed smoothly under the high reaction efficiency.

What is claimed is:

1. A method of reducing iron ore in a fluidized bed, comprising the steps of:
   (a) pyrolyzing coal in a first fluidized bed reactor thereby producing char and a gaseous product which contains tar;
   (b) thermally cracking said gaseous product in a second fluidized bed reactor which contains powdered iron ore, thereby depositing a carbonaceous material on the surface of the iron ore powder and producing a gas; and
   (c) reducing said coated iron ore powder in a third bed which is fluidized by a gas mixture composed of a gas generated in a gas generating apparatus and said gas produced in the second, thermal cracking step.

2. The method of claim 1, wherein said carbonaceous material deposited on the surface of the iron ore powder is tar.

3. The method of claim 1, wherein the gas produced upon thermal cracking in the second step is comprised of hydrocarbon materials and the gas generated in said gas generating apparatus is comprised mainly of CO and $H_2$.

4. The method of claim 1, wherein said gas generated in said gas generating apparatus is prepared from said char obtained by the pyrolysis of coal in said first fluidized bed reactor.

5. The method of claim 3, wherein said gas produced upon thermal cracking in said second step is a cracked product comprised of light hydrocarbons, said gas being steam-reformed prior to being mixed as a component of said reducing gas in the reducing step of the present process.

6. The method of claim 3, wherein the gas components of said gas mixture are mixed and then reformed prior to being supplied to said reducing step.

7. The method of claim 1, wherein the temperature of pyrolysis in the first fluidized bed reactor ranges from 450° to 700° C.

8. The method of claim 1, wherein the temperature during thermal cracking in said second fluidized bed reactor ranges from 450° to 850° C.

9. The method of claim 1, wherein the carbonaceous material deposited on the powdered iron ore in the second step of the process ranges from 2 to 10 wt.%, based on the amount of iron ore.

10. The method of claim 1, wherein the temperature in the third fluidized bed reactor ranges from 850° to 1100° C.

11. The method of claim 6, wherein said gas obtained upon thermal cracking in the second step is mixed with additional hydrocarbon gas, and the resulting hydrocarbon gas and vapor mixture is mixed with the gas generated in said gas generating apparatus for use as said reducing gas.

12. The method of claim 4, wherein the char in said gas generating apparatus is mixed with coal, coke and other carbonaceous materials in order to prepare the gas generated in said apparatus.

* * * * *